United States Patent
Ranpise et al.

(10) Patent No.: US 11,438,193 B2
(45) Date of Patent: Sep. 6, 2022

(54) EVPN MULTIHOMING OPTIMIZATIONS FOR ETHERNET SEGMENT CONNECTION INTERRUPTIONS

(71) Applicant: Arista Networks, Inc., Santa Clara, CA (US)

(72) Inventors: Amit Dattatray Ranpise, San Jose, CA (US); Rajesh Kumar Semwal, Sunnyvale, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 110 days.

(21) Appl. No.: 16/774,519

(22) Filed: Jan. 28, 2020

(65) Prior Publication Data

US 2021/0234727 A1 Jul. 29, 2021

(51) Int. Cl.

| | |
|---|---|
| *H04L 45/50* | (2022.01) |
| *H04L 12/46* | (2006.01) |
| *H04L 9/40* | (2022.01) |
| *H04W 76/11* | (2018.01) |
| *H04L 45/00* | (2022.01) |

(52) U.S. Cl.
CPC .......... *H04L 12/4641* (2013.01); *H04L 45/50* (2013.01); *H04L 45/66* (2013.01); *H04L 63/0236* (2013.01); *H04L 63/0876* (2013.01); *H04W 76/11* (2018.02)

(58) Field of Classification Search
CPC . H04L 12/4641; H04L 45/50; H04L 63/0236; H04L 45/66; H04L 63/0876; H04W 76/11
See application file for complete search history.

(56) References Cited

U.S. PATENT DOCUMENTS

| | | | |
|---|---|---|---|
| 2016/0277210 A1* | 9/2016 | Lin | H04L 45/66 |
| 2017/0099180 A1* | 4/2017 | Singh | H04L 12/413 |
| 2018/0309596 A1* | 10/2018 | Brissette | H04L 12/4679 |
| 2019/0149456 A1* | 5/2019 | Brissette | H04L 12/462 |
| | | | 370/225 |

(Continued)

OTHER PUBLICATIONS

"RFC 7432—BGP MPLS-Based Ethernet VPN", RFC 7432—BGP MPLS-Based Ethernet VPN, Internet Engineering Task Force (IETF), Feb. 2015 (57 pages).

*Primary Examiner* — Lan-Huong Truong
(74) *Attorney, Agent, or Firm* — Fountainhead Law Group P.C.

(57) ABSTRACT

Techniques described herein provide for expediting routing convergence in EVPN with multihomed ethernet segment when one of the redundant devices loses connection to the ethernet segment. When a first redundant device receives EVPN auto discovery (AD) route advertising an ethernet segment from a second redundant device, it creates an entry for a forwarding table. The entry has, for an advertised MAC address, a local identifier of the ethernet segment (marked as active next hop) and the identifier of the second network device (marked as backup next hop). When a packet for that MAC address is received, the first redundant device routes the data using data from the entry. In particular, the first redundant device uses the local identifier of the ethernet segment as next hop when the ethernet segment link is active; and uses the identifier of the second network device as next hop when the ethernet segment is down.

30 Claims, 8 Drawing Sheets

(56) References Cited

U.S. PATENT DOCUMENTS

2019/0296966 A1* 9/2019 Gao .................. H04L 45/28
2019/0305988 A1* 10/2019 Bickhart ............ H04L 12/4633
2020/0021523 A1* 1/2020 Wang ................ H04L 12/4641

* cited by examiner

VTEP A1 Forwarding Table (Healthy)   300

| MAC | Next Hop Group | Flags |
|---|---|---|
| MAC-S1 | 1. Local ID of ES with ESI-10 | Active |
| MAC-S2 | | |
| ..... | | |
| MAC-SN | 2. [VTEP-A2; Label-2] | Backup |

FIG. 3

VTEP A1 Forwarding Table (Local Link Lost)   400

| MAC | Next Hop Group | Flags |
|---|---|---|
| MAC-S1 | | |
| MAC-S2 | | |
| ..... | | |
| MAC-SN | 1. [VTEP-A2; Label-2] | Active |

FIG. 4

EVPN MULTIHOMING OPTIMIZATIONS FOR ETHERNET SEGMENT CONNECTION INTERRUPTIONS

BACKGROUND

The present disclosure relates to optimization of network routing for devices that provide multihoming in the Ethernet Virtual Private Network (EVPN) environment. In particular, multihoming redundant devices for an ethernet segment may store backup paths in a forwarding table for immediate use in case of ethernet segment link interruption.

SUMMARY

In some computer networks, network devices (e.g., routers, switches, etc.) are configured in multihoming topologies, where two or more network devices provide an active redundant connection to the same host. In an ethernet virtual private network (EVPN), the various direct connections between a multihomed host and the redundant network devices are referred to as an ethernet segment (ES) and are assigned an ethernet segment identifier (ESI). The ESI may be a Border Gateway Protocol control plane value shared by multiple Virtual Tunnel End Points. For example, an exampere format for the ESI may be the format described by RFC7432 (BGP MPLS-Based Ethernet VPN), https://tools.ietf.org/html/rfc7432 which is hereby incorporated herein in its entirety. Each of the redundant network devices advertises, to each other and to other network devices with which it maintains an EVPN session, a route (such as an EVPN auto discovery (AD) route) for the ES.

There are multiple types of EVPN AD routes. One type of EVPN AD route, referred to as an EVPN AD per ES route, is advertised by the redundant network devices for each ES to which they are directly connected. When a redundant network device receives an EVPN AD per ES route from another redundant network device connected to the same ES, the receiving network device uses the route for configuring "split horizon" functionality.

Another type of EVPN AD route, referred to as an EVPN AD per EVPN instance (EVI) route, is advertised by the redundant network devices for each ES and EVI combination configured on the network devices. The ES must be an ES to which the network device is directly connected, and the EVI must be a locally configured EVI (i.e., an EVI configured on the network device advertising the EVPN AD route). An EVI may also be referred to as a media access control (MAC) virtual routing and forwarding (VRF) instance. When a redundant network device receives an EVPN AD per EVI route from another redundant network device connected to the same ES, the receiving network device uses the route to determine that the advertised MAC address is reachable on a local link (i.e., the ES). In contrast, when a remote network device (a device not directly connected to the ES) receives an EVPN AD per EVI route, the remote network device uses the route to form an equal cost multipath (ECMP) group for the advertised ES. For example, when the remote network device receives an EVPN AD per EVI route for the ES from one of the redundant network devices, it will determine that the ES is reachable via each of the redundant network devices because they are all connected to the ES. The remote network device will then generate an ECMP group for the ES, the group including all of the redundant network devices that are connected to the ES. Thus, even if only one of the redundant network devices advertises a MAC route including the ESI value of the ES, the remote network device will infer that the MAC address is reachable via all of the redundant network devices connected to the ES, even if it has not received MAC routes from the other redundant network devices.

In the multihoming configuration, all of the redundant network devices have advertised, to each other and to remote network devices, EVPN AD routes for the ES, and have advertised EVPN MAC routes for the multihomed host. Thus, all of the network devices in the EVPN session are configured to send traffic destined for the multihomed host to the ES that is reachable via either of the redundant network devices. This configuration provides greater efficiency for network traffic going to and from the multihomed host, particularly if the multihomed host is a very active host, such as a hypervisor running multiple virtual machines. However, if any of the redundant network devices' link to the ES is interrupted, there may be a prolonged outage and resulting loss of traffic while routes are withdrawn or deleted and forwarding tables are updated throughout the network.

Various systems and methods described herein address these problems by configuring redundant network devices to store a backup path for hosts reached via an ES. In particular, the redundant routers are configured to (i) update forwarding tables (e.g., MAC tables) with backup paths for hosts reachable via an ES, and (ii) quickly switch to a backup path for a host reachable via an ES when the ES link is interrupted.

A forwarding table includes entries of the reachability information for MAC addresses. An example entry comprises, as a key, a MAC address, and as a value, a next hop identifier. The next hop identifier may be a local identifier of the ethernet segment that is identified by the ESI. For example, the local identifier may be a 2-bytes or 4-bytes value (depending on forwarding chipset) that identifies the Ethernet segment locally (e.g., to the local Virtual Tunnel End Points).

In some embodiments, in order to configure a backup path for hosts reached via an ES, the redundant network devices, upon receiving an EVPN AD per ES route, extract from the route an ESI and an identifier (such as a multiprotocol label switching (MPLS) label) of the network device advertising the route. The redundant network device then determines whether any of the entries in its forwarding table match the ES identified ESI extracted from the route. The match is identified by first translating the ESI extracted from the route to a local identifier of the ES used by the local device, and then searching the forwarding table for the translated local identifier of the ES. If an entry includes such matching local identifier of the ethernet segment, the redundant network device will update the entry to, instead of having a single next hop identifier, have a next hop group including the local identifier of the ethernet segment and the identifier of the network device that advertised the route. The local identifier of the ethernet segment may be configured as the active next hop, and the identifier of the network device that advertised the route may be configured as a backup next hop. In some embodiments, the identifier of the network device may be a tuple that includes (a) IP address extracted from the EVPN AD route; and (b) label information advertised in the EVPN AD route.

Similarly, when the redundant network device generates forwarding table entries for any new MAC addresses learned (either on the control plane or via the ES), the generated entries for those new MAC addresses will include a next hop group including the local identifier of the ethernet segment and the identifier of the network device that advertised the EVPN AD per ES route. In embodiments where more than two redundant network devices are connected to the same ES, the next hop group will include the local identifier of the ethernet segment and the identifiers of each of the redundant network devices that have advertised an EVPN AD per ES route including that ESI.

When the redundant network device determines that a link to an ES has been interrupted, the redundant network device updates the forwarding table to switch to the backup next hop for entries that include the local identifier of the ethernet segment of the ES to which the link has been interrupted. For example, the redundant network device may remove the local identifier of the ethernet segment from any entries that include the ESI in a next hop group. Alternatively, the redundant network device may configure the backup next hop to become active and configure the local identifier of the ethernet segment to become an inactive entry in any next hop groups that include the local identifier of the ethernet segment.

In some embodiments, an entry associated with the MAC address may be a next hop group entry that is also associated with several other MAC addresses (e.g., MAC addresses of all devices or virtual devices that are multihomed by the redundant network device). In that case whenever the entry is updated for one MAC addresses, the next hop update will also apply to all other MAC addresses associated with that next hop group. In this way, the backup recovery is improved, since a change to a single next hop group (e.g., making the back-up route active) will repair routing for many MAC addresses.

This approach allows the redundant network device to switch to a backup path for any MAC addresses that are reachable via an ES nearly instantaneously when the link to the ES is interrupted. Interruptions to network traffic are minimized because the only device that needs to be reconfigured is the network device for which the link to the ES is interrupted. No additional configuration or updating of routes or forwarding tables on any other devices is needed. Thus, in addition to increasing the speed at which the traffic is rerouted, additional network traffic (such as route withdrawals and new route advertisements) and use of network resources are minimized.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which:

FIG. 3 shows a diagram of an illustrative table for use in optimized routing, in accordance with some embodiments of the present disclosure;

FIG. 4 shows a diagram of another illustrative table for use in optimized routing, in accordance with some embodiments of the present disclosure;

DETAILED DESCRIPTION

Figure 1A:
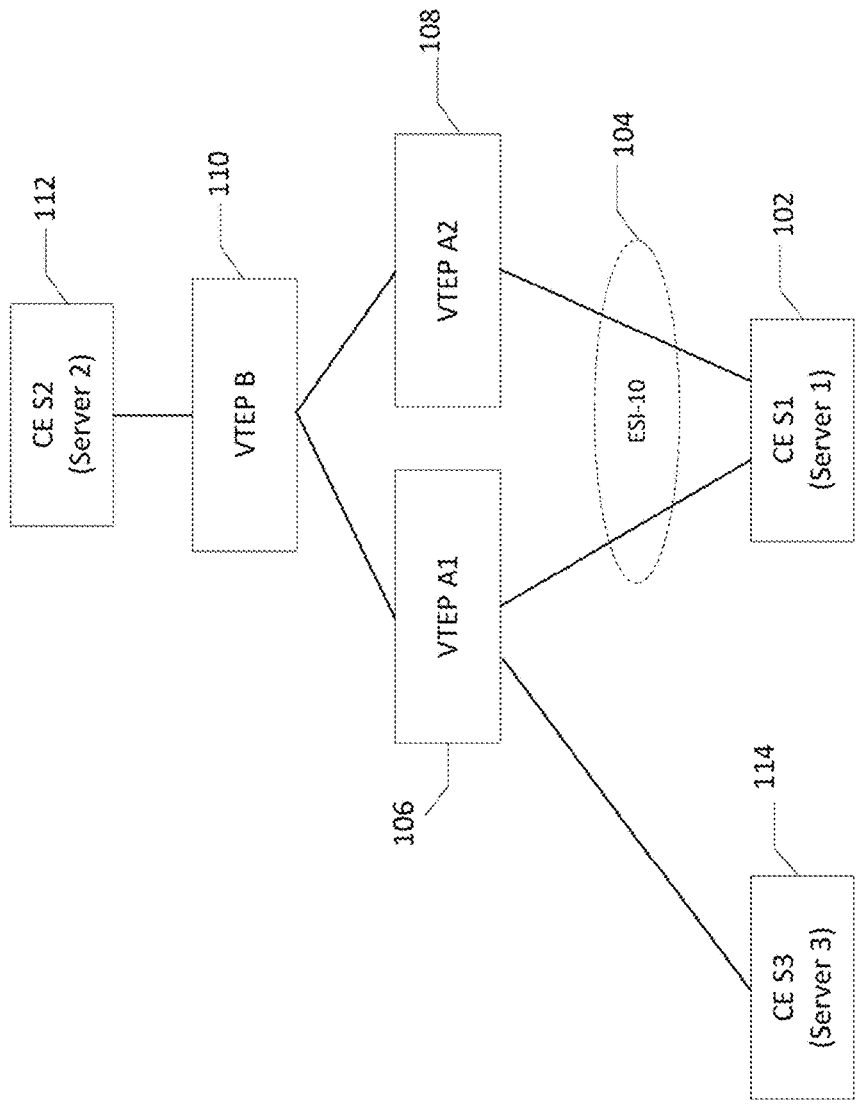
FIG. 1A shows an illustrative network topology of a system for optimizing routing in an EVPN environment, in accordance with some embodiments of the disclosure.

FIG. 1A shows an illustrative diagram of system 100 for optimizing forwarding tables (e.g., MAC tables) in an EVPN environment configured for devices (e.g., routers, switches, etc.) 112, 110, 106, 108, 102, and 114. In some embodiments, links between devices 112, 110, 106, 108, 102, and 114 may be an overlay of the virtual links configured over an underlay of physical devices.

System 100 is shown as having three customer edge (CE) devices: server 102, server 114, and server 112. System 100 also has three provider edge (PE) devices. In the shown embodiment, the PE devices include three Virtual Tunnel End Points (VTEPs) including VTEP A1 106, VTEP A2 108, and VTEP B 110. However, one skilled in the art would understand that the same techniques may be used by a system containing any number of PE devices, and CE devices servicing any number of ethernet segments. In some embodiments, server 102 may be a hypervisor serving several virtual machines, each with its own Layer 2 address (e.g., MAC address).

In the shown embodiment, the system 100 is configured to run in active-active redundancy mode by providing server 102 which is being multihomed by a direct connection to both VTEP A1 106 and VTEP A2 108 using an Ethernet Segment (ES) links which is configured with Ethernet Segment Identifier (ESI) ESI-10. Since this is an active-active multihoming connection, both VTEP A1 106 and VTEP A2 108 are eligible to receive traffic (e.g., network packets) from server 102 via ES 104 (e.g., using ESI-10 as an address). Both VTEP A1 106 and VTEP A2 108 can also send or forward traffic (e.g., network packets) to server 102 via ES 104 (e.g., using ESI-10 as an address).

Each of redundant network devices VTEP A1 106 and VTEP A2 108 may advertise, to each other and to other network devices with which they maintain an EVPN session (e.g., VTEP B 110), a route (such as an EVPN auto discovery (AD) route) for the ES 104 with identifier ESI-10. In the multihoming configuration, VTEP A1 106 and VTEP A2 108 may send several types of EVPN Auto Discovery (AD) route advertisements to each other and to devices 114, 102, 110, and 112.

One type of EVPN AD route, referred to as an EVPN AD per ethernet segment route, is advertised by network devices VTEP A1 106 and VTEP A2 108 for each ethernet segment to which they are directly connected (e.g., for ethernet segment 104). In some embodiments, when VTEP A1 106 receives an EVPN AD per ES route from a VTEP A2 108 (which is connected to the same ethernet segment 104), VTEP A1 106 may use the route for configuring "split horizon" functionality. For example, when "split horizon" functionality is set up, the configuration will make sure that when VTEP A2 108 receives a packet (e.g., a broadcast packet) from CE 102 and sends it to VTEP A1 106 for the purpose of flooding the packet to other devices, VTEP A1 106 will not send the same packet back to CE 102 to prevent packets from looping in a network.

Another type of EVPN AD route that may be sent by multihoming devices VTEP A1 106 and VTEP A2 108, may be referred to as an EVPN AD per EVPN instance (EVI) route. An EVI route may be advertised by VTEP A1 106 (or by VTEP A2 108) for each ethernet segment and EVPN instance combination configured on the VTEP A1 106 (or VTEP A2 108). For each such AD route, the ethernet segment must be an ethernet segment to which the VTEP A1 106 (or VTEP A2 108) is directly connected, and the EVPN instance must be a locally configured EVPN instance (e.g., an EVI configured on the VTEP A1 106 that is advertising the EVPN AD route). An EVPN instance may also be referred to as a media access control (MAC) virtual routing and forwarding (VRF) instance.

When VTEP A1 106 receives an EVPN AD per EVI route from another redundant VTEP A2 108 (connected to the same ES 104), VTEP A1 106 uses such route to determine that the advertised MAC address is reachable on a local link (i.e., ES 104). For example, if VTEP A1 106 receives an EVPN AD per EVI route from VTEP A2 108 advertising MAC address of CE 102, VTEP A1 106 will learn that CE 102 is reachable via a local ES 104 connection (e.g., via ESI-10).

Remote multihoming devices VTEP A1 106 and VTEP A2 108 may receive an EVPN AD per EVI route for an 'aliasing' feature. In other words, remote devices may learn that a remote MAC address is accessible through both VTEP A1 106 and VTEP A2 108 when receiving an EVPN AD per EVI route from just one of the VTEP A1 106 and VTEP A2 108.

For example, when a VTEP B 110 (a device not directly connected to ES 104) receives an EVPN AD per EVI route (e.g., advertisement for MAC address of CE 1 102 on ethernet segment 104) from VTEP A1 106, it uses the received route to form an equal cost multipath (ECMP) group for the advertised ethernet segment 104. In particular, when VTEP B 110 receives an EVPN AD per EVI route for the ES 104 from VTEP A1 106, it determines that the ethernet segment 104 is reachable via both VTEP A1 106 and VTEP A2 108 because they are all connected to the ethernet segment 104.

In some embodiments, VTEP B 110 will then generate an ECMP group for the ES 104, the group including all of the redundant network devices that are connected to the ES (e.g., VTEP A1 106 and VTEP A2 108). In this configuration, even if only one of the redundant network devices (e.g., VTEP A1 106) advertises a MAC route including the ESI value of the ES (e.g., MAC address of CE 102 available via ESI-10), VTEP B 110 may determine that the MAC address of CE 102 is reachable via VTEP A1 106 and VTEP A2 108, even if VTEP B 110 has not received that MAC route from VTEP A2 108.

While system 100 is in healthy configuration (e.g., with no ethernet segments links being down), as shown in FIG. 1A, all of the redundant network devices (VTEP A1 106 and VTEP A2 108) will eventually advertise, to each other and to remote network devices (e.g., to VTEP B 110), EVPN AD routes for ESI 104, and will also advertise EVPN MAC routes for the multihomed CE 102 via ESI 104.

Accordingly, all of the network devices in the EVPN session (e.g., devices 106, 108, 110) will become configured to send traffic destined for CE 102 to ES 104, which is, in turn, known to be reachable via either of the redundant network devices VTEP A1 106 and VTEP A2 108.

Figure 1B:
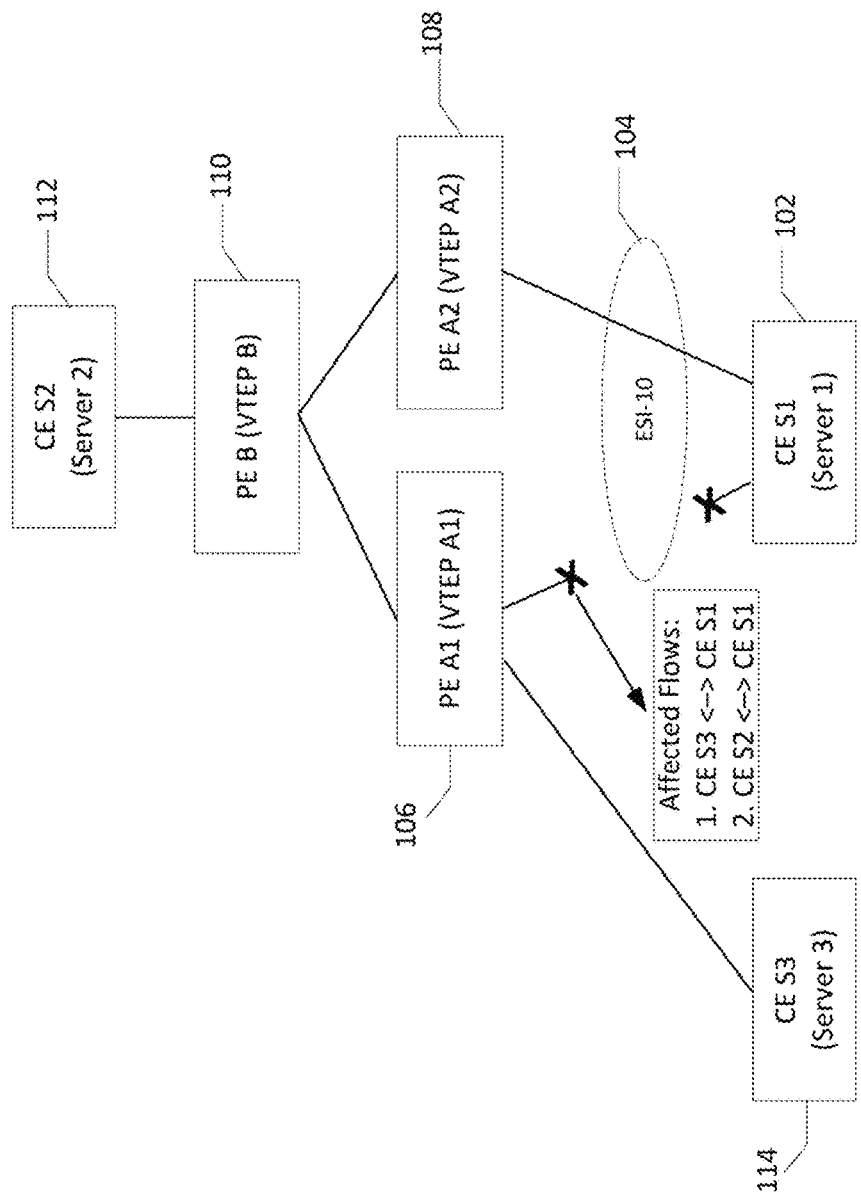
FIG. 1B shows another illustrative network topology of a system for optimizing routing in EVPN environment, in accordance with some embodiments of the disclosure.

FIG. 1B shows an illustrative diagram of system 150 for optimizing MAC tables in an EVPN environment configured for devices (e.g., routers, switches, etc.) 112, 110, 106, 108, 102, and 114. System 150 may have the same devices and links as shown in system 100 except that a link between VTEP AI 106 and ES 104 is interrupted or down. Such an event will have wide implications in the network 150 and will affect traffic flows from CE 114 to CE 102 and from CE 112 to CE 102. While CE 102 may still be reachable, a large amount of traffic may be affected by out of date MAC tables configured by ECMP algorithm that were aware that CE 102 on ES 104 is reachable through both VTEP A1 106 and VTEP A2 108.

In one approach, when an ES link becomes broken, the system will need to take elaborate repair steps. First, VTEP A1 106 (which lost the ES 104 link) will need to notify to the control plane of system 150 of a 'link down' event. Then, the control plane will delete the previously advertised AD route for ES 104. This will also cause the control plane to delete previously advertised MAC paths from the Border Gateway Protocol (BGP) EVPN subsystem running on devices 110, 106, and 108. Such a withdrawal of self-advertised MAC paths will cause the locally running BGP subsystems (e.g., on devices 110, 106, and 108) to re-run the best path algorithm for each withdrawn MAC address (e.g., MAC address of CE 102). This re-running of the best path algorithm will cause a creation of new MAC table entries (e.g., in MAC tables of devices 110, 106, and 108) to be installed where the MAC address entries will point to VTEP A2 108. The new entry will be propagated from the control plane to hardware MAC tables (e.g., in the underlay devices). Only after all these steps are complete, will the functionality of system 150 recover.

To overcome this problem, multihoming devices (e.g., devices VTEP A1 106 and VTEP A2 108) may be configured to store both an active path and a backup path for hosts (e.g., CE 102) reachable via ES 104. For example, the paths may be stored in the forwarding table (e.g., in MAC tables) shown in FIGS. 3 and 4. During normal operation of system 150, each multihoming device (e.g., each one of device VTEP A1 106 and VTEP A2 108) will update the forwarding as will be described below, to list both active and backup paths to hosts (e.g., to CE 102). In the event of ES 104 link interruption, the affected one of devices VTEP A1 106 and VTEP A2 108 will quickly switch to sending traffic via the backup path listed in its own MAC table to reach a host that is still available via ES 104 (e.g., via the other multihoming VTEP).

In some embodiments, VTEP A1 106 (and/or VTEP A2 108) may use an EVPN AD per ES route messages (which are otherwise used for 'split horizon' functionality only) to generate an updated MAC table. Such a table may include entries listing a MAC address (as a key) and an associated next hop group for that MAC address. For example, initially, VTEP A1 106 may configure the MAC table to list a MAC address for CE 102 to point to a local identifier of the ethernet segment 104 (e.g., the same ES that has global identifier ESI-10). This entry may also receive an "active" flag. After receiving an EVPN AD per ES route (e.g., from VTEP A2 108), VTEP A1 106 may extract from the route an ESI (e.g., ESI-10) and an identifier (such as a multiprotocol label switching (MPLS) label) of the network device advertising the route (e.g., MPLS label of VTEP A2 108). In some embodiments, the EVPN AD per ES route must include an "all-active" flag to be used in this manner. Then, VTEP A1 106 may determine that it already has an entry in the MAC table that points to the same ES (e.g., ES 104 with identifier ESI-10).

In response to this determination, VTEP A1 106 modifies the next hop associated with the MAC address of CE 102.

In particular, the modified next hop group may now include, as the next hop, an identifier for the VTEP A2 108 which may be a tuple that includes: an IP address carried as next hop in the EVPN AD per ES route and MPLS label advertised in the EVPN AD route (e.g., of VTEP A2 108). This entry may receive a "backup" flag. In some embodiments, the entry is created and marked as "backup", only if VTEP A1 106 received, for ES 104, both an EVPN AD route per EVPN instance and an EVPN AD route per ESI.

In some embodiments, identifier of the network device (e.g., VTEP A2 108) may be established as follows. ESI-10 may be extracted from EVPN AD per EVI route. This route is advertised for the given ESI (e.g., for ESI-10). In some embodiments, ES identified by ESI-10 may span multiple virtual local areas networks (VLANs), where an EVPN instance is configured for each VLAN. In this case, each network device (e.g., VTEP A2 108) may advertises one AD per EVI route for each such EVPN instance. Consequently, there may be multiple AD per EVI routes advertised for the same EVPN instance. However, each such route corresponds to distinct EVPN instance. Each such AD per EVI route for the given Ethernet may carry a tuple information (IP address, label). The label typically changes for each EVI, but IP address stays the same. These IP address and the label may be used as a tuple that serves as identifier of the network device in the forwarding table.

This process may be repeated for every MAC address that is multihomed to both VTEP A1 106 and VTEP A2 108. This process may also be performed by VTEP A2 108, and by any other device that is redundant with VTEP A1 106 and VTEP A2 108 for multihomed devices on ES 104.

Similarly, when the VTEP A1 106 generates forwarding table entries for any new MAC addresses learned (either on the control plane of system 150 or via the ES 104), the generated entries for those new MAC addresses will include a next hop group including the ESI of ES 104 and the identifier of the network device that advertised the EVPN AD per ES route (e.g., VTEP A1 106). In embodiments where more than two redundant network devices are connected to the ES 104, the next hop group may include the ESI and the identifiers of each of the redundant network devices that have advertised an EVPN AD per ES route including ESI-10 (e.g., the identifier of ES 104).

When VTEP A1 106 learns that the link to ES 104 was interrupted, VTEP A1 106 updates the MAC table to switch to the backup next hop for entries that include the local identifier of the ethernet segment 104. For example, VTEP A1 106 may remove local identifier of the ethernet segment 104 from all entries that includes local identifier of the ethernet segment 104 in a next hop group and/or set one of the other entries to have a flag of "active."

In some embodiments, the entry associated with the MAC address of CE 102 may be a next hop group entry that is also associated with several other MAC addresses (e.g., MAC addresses of all devices or virtual devices that are multihomed by VTEP A1 106 and VTEP A2 108). In that case, whenever the entry is updated for one MAC addresses, the next hop update will also apply to all other MAC addresses associated with that next hop group. In this way, the backup recovery is improved since a change to a single next hop group (e.g., making the back-up route active) will repair routing for many MAC addresses.

Figure 2:
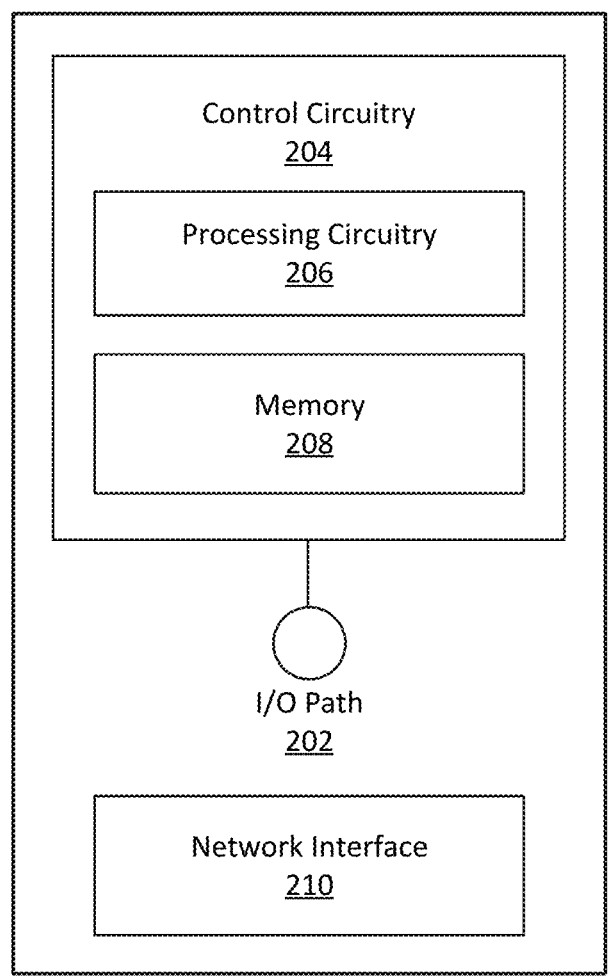
FIG. 2 shows a diagram of an illustrative network device for optimizing routing in EVPN environment, in accordance with some embodiments of the disclosure.

FIG. 2 shows a generalized embodiment of a network device usable in a system for optimized routing, in accordance with some embodiments of the disclosure. In particular, device 200 of FIG. 2 may be any of the devices depicted in FIGS. 1A and 1B (e.g., devices 102, 106, 108, 110, 112, and 114) or may be a physical or virtual device hosting any of physical or virtual devices 102, 106, 108, 110, 112, and 114. Device 200 may be a router, an L3 switch, an L2 router, or a host, and/or any other computing device that may be configured to participate in EVPN switching or routing. Device 200 may receive data via data network interfaces 210 and provide the received data to control circuitry 204 via an input/output (I/O) path 202. Control circuitry 204 includes processing circuitry 206 and storage 208. Storage 208 may include volatile memory 330 (such as random-access memory (RAM), for example, static RAM and/or dynamic RAM), which does not retain its contents when power is turned off, and non-volatile memory 208 (such as, for example, a solid state drive (SSD), a hard disk drive (HDD), electrically erasable programmable read-only memory (EEPROM), etc.), which does retain its contents when power is turned off. Control circuitry 204 may send and receive commands, requests, and other suitable data using I/O path 202. As noted above, I/O path 202 connects control circuitry 204 (and specifically processing circuitry 206) to network interface 210, which in turn connects device 200 to one or more other devices. For example, I/O path 202 may provide route packets to next hops listed in a forwarding table.

Control circuitry 204 may be based on any suitable processing circuitry, such as processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 204 executes instructions suitable to implement any of the techniques described above or below.

Storage 208 may be an electronic storage device that is part of control circuitry 204. As referred to herein, the phrase "electronic storage device" or "storage device" should be understood to mean any device for storing electronic data, computer software, instructions, and/or firmware, such as RAM, content-addressable memory (CAM), hard disk drives (HDDs), optical drives, solid state devices (SSDs), quantum storage devices, or any other suitable fixed or removable storage devices, and/or any combination of the same. The circuitry described herein may execute instructions included in software running on one or more general purpose or specialized processors. In some embodiments, storage 208 may include a MAC table, e.g., as shown in FIGS. 3 and 4. Multiple circuits may be provided to handle simultaneous processing functions. In some embodiments, device 200 may be a virtual device, wherein components 204, 206, 208, 202 and 210 are virialized on top of another physical device.

FIG. 3 shows a diagram of an illustrative table 300 for use in optimized routing, in accordance with some embodiments of the present disclosure. In particular, table 300 may have been configured by VTEP A1 106 when system 100 was healthy (e.g., when link between VTEP A1 106 and ES 104 was operational).

Table 300 may include all MAC addresses known by VTEP A1 106. Each MAC address may be associated with a next hop group, listing an address and/or label of the next hop to which traffic may be routed, when that traffic is destined for a device associated with the respective MAC address. FIG. 3 shows a single group of MAC address reachable by the local ES, however if VTEP A1 106 services multiple ethernet segments, table 300 may include other next hop groups (not shown) with different next hop identifiers.

For example, MAC-S1 may be a MAC address of CE 102 (or of one of the virtual machines handled by CE 102 when CE 102 acts as a hypervisor). Initially, MAC-S1 may be associated with a next hop group that has a single entry. In particular, since ES 104 is active, local identification of that ethernet segment (e.g., ES 104) may be stored in the next hop group associated with MAC-S1. That address may have an "active" flag.

Later, VTEP A1 106 may receive, from VTEP A2 108, an EVPN AD per ES route message. The message may advertise address MAC-S1 and identify the ES 104 connection. The EVPN AD per ES route message may also include an MPLS label of VTEP A2 108. In some embodiments, VTEP A1 106 may only use this message to perform 'split horizon' functionality (to e.g., avoid sending flood packets received from CE 102 via VTEP A2 108 back to CE 102). However, in some embodiments, VTEP A2 108 may also modify the next hop group associated with MAC-S1 in table 300.

In particular, VTEP A1 106 may determine that the ES identified by the EVPN AD per ES route message (e.g., ESI-10) matches the ES identified by a next hop in the next hop group of MAC-S1. The match is identified by first translating the ESI extracted from the route to a local identifier of the ES used by VTEP A1 106, and then searching the forwarding table of VTEP A1 106 for the translated local identifier of the ES. This next hop group may then be modified to have an additional entry identifying VTEP A2 108 and the MPLS label of VTEP A2 108 (e.g., Label-2). This next hop entry may receive a flag "backup." In some embodiments, if a device with MAC-S1 is multihomed by more than one device, the next hop group may also include additional identifiers of other network devices providing multihoming functionality, each also having a flag with a value "backup."

In some embodiments, similar steps may be used to associated additional MAC addresses (e.g., MAC addresses MAC-S2-MAC-SN that are accessible via the same ES). In some embodiments, the other MAC addresses in table 300 may be real devices on ES 104 or virtual devices administered by CE 102. As shown, MAC addresses MAC-S1-MAC-SN may share the same next hop group. In some embodiments, table 300 may be used by VTEP A1 106 to route traffic destined for MAC-S1 as will be described in FIGS. 5 and 6.

Beneficially, because MAC addresses MAC-S1-MAC-SN share the same next hop group, the back-up next hop established for a single MAC address (e.g., MAC-S1) will also apply to all other MAC addresses MAC-S1-MAC-SN.

FIG. 4 shows a diagram of an illustrative table 400 for use in optimized routing, in accordance with some embodiments of the present disclosure. In particular, table 400 may have been configured by VTEP A1 106 when system 150 was damaged (e.g., when link between VTEP A1 106 and ES 104 was interrupted). In some embodiments, VTEP A1 106 may pro-actively create table 400 by modifying table 300 in event when link between VTEP A1 106 and ES 104 was interrupted.

In particular, VTEP A1 106 may modify table 400 to remove active local link next hop associated with ES 104, and mark one of the other entries in the next hop group as active. For example, for a next hop group associated with MAC addresses MAC-S1-MAC-SN, a next hop identifying VTEP A2 108 and its MPLS label may now be marked active.

In some embodiments, instead of deleting the local link next hop entry associated with ES 104, VTEP A1 106 may mark this next hops as "inactive." In some embodiments, instead of changing the flags, VTEP A1 106 may use back-up next hop only when link between VTEP A1 106 and ES 104 is determined to be interrupted.

Beneficially, because MAC addresses MAC-S1-MAC-SN share the same next hop group, the change in the next hop group established for a single MAC address (e.g., MAC-S1) will also apply to all other MAC addresses MAC-S1-MAC-SN (e.g., MAC addresses for devices multihomed by VTEP A1 106 and VTEP A2 108). That is, when identified next hop [VTEP-A2; Label-2] becomes marked is "active," this change will affect all traffic destined for devices with MAC addresses MAC-S1-MAC-SN. That is, whenever a message is received that is destined for any of MAC addresses MAC-S1-MAC-SN, that messages will be forwarded to [VTEP-A2; Label-2]. In this the recovery of the system after a link-down event is maximized.

Figure 5:
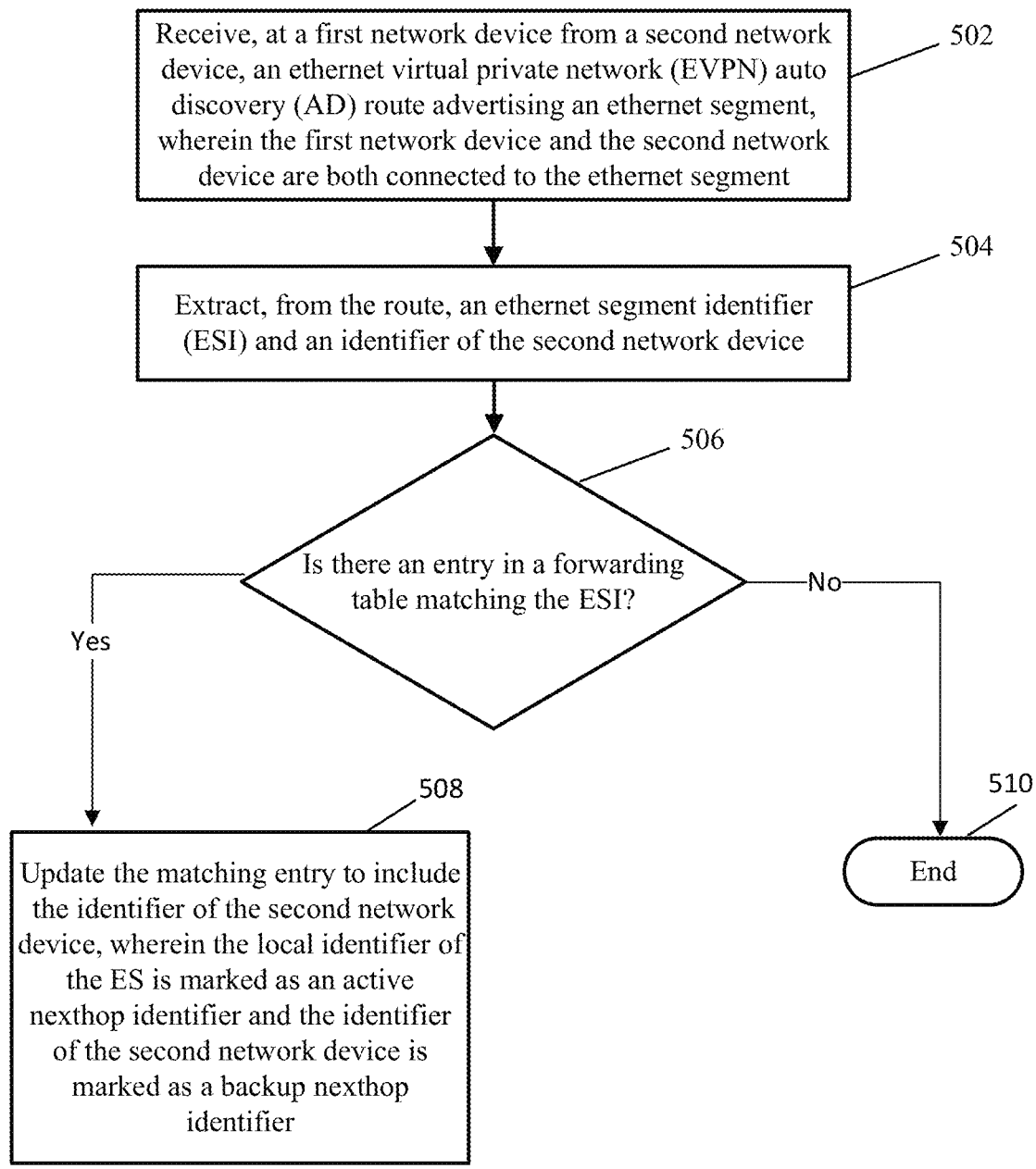
FIG. 5 is a flowchart of an illustrative process for creating a table for optimizing routing, in accordance with some embodiments of the present disclosure.

FIG. 5 is a flowchart of a detailed illustrative process for creating a forwarding table (e.g., a MAC table) for optimized routing, in accordance with some embodiments of the present disclosure. Process 500 may be performed by physical or virtual control circuitry, such as control circuitry 204 of device 200 (FIG. 2). For example, process 500 may be performed by control circuitry of VTEP A1 106 of FIG. 1.

At 502, the control circuitry of a first network device (e.g., VTEP A1 106) receives from a second network device (e.g., VTEP A1 106), an ethernet virtual private network (EVPN) auto discovery (AD) route advertising an ethernet segment. In some embodiments, the first network device and the second network device are both connected to the same ethernet segment (e.g., ES 104). For example, the first and second network devices may provide multihoming capabilities to at least one host on the ethernet segment.

At 504, the control circuitry, extracts, from the route, an ethernet segment identifier (ESI) and an identifier of the second network device. For example, the control circuitry may determine that the route advertises access to MAC-S1 (as shown in table 300 of FIG. 3) via VTEP A2 108 using ESI-10 (of FIG. 1).

At 506, the control circuitry checks if the local MAC table (e.g., a table stored in memory 208) already includes a next hop entry that matches an ES identified by identifier ESI-10 as the next hop for the MAC-S1 address. In particular, the control circuitry may extract ESI-10 from the route and translate it to the local identifier of the ES used by the local device (e.g., VTEP A1 106 of FIG. 1). In some embodiments, the control circuitry may then check if any entries in forwarding table (e.g., the MAC table of VTEP A1 106) includes an entry that lists the translated local identifier of the ES. If such a matching entry is found, at 508, that entry is updated to also include the identifier of the second network device. For example, the identifier of the second network device may be a tuple that includes (a) IP address extracted from the EVPN AD route; and (b) label information advertised in the EVPN AD route (e.g., an MPLS label). The local identifier of the ethernet segment next hop is then marked as an active next hop identifier, and the identifier of the second network device is marked as a backup next hop identifier. If not, process 500 ends at 510.

Figure 6:
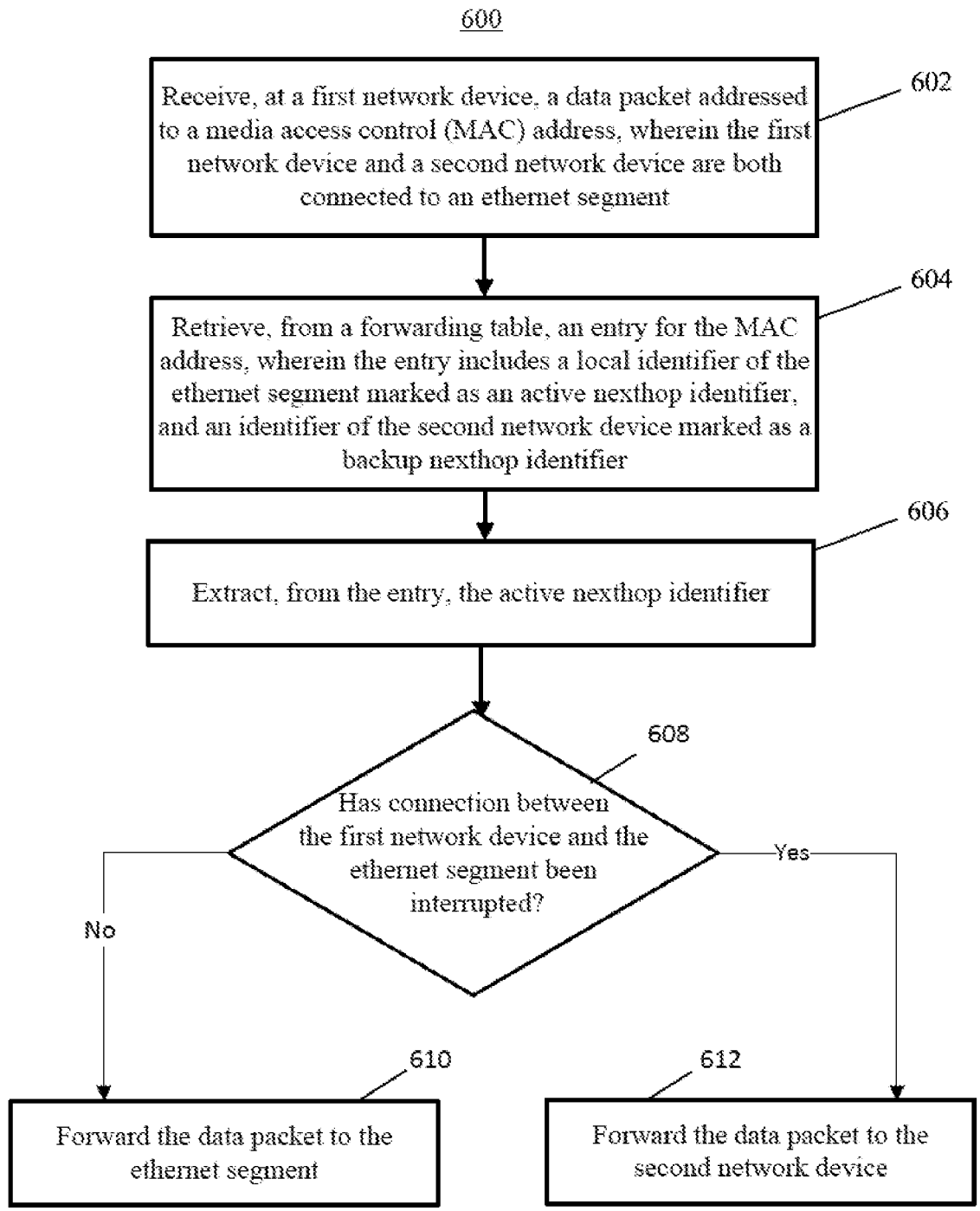
FIG. 6 is another flowchart of an illustrative process for optimizing routing, in accordance with some embodiments of the present disclosure.

FIG. 6 is a flowchart of a detailed illustrative process for using a forwarding table (e.g., a MAC table created in FIG.

5) for optimized routing, in accordance with some embodiments of the present disclosure. Process 600 may be performed by physical or virtual control circuitry, such as control circuitry 204 of device 200 (FIG. 2). For example, process 600 may be performed by control circuitry of VTEP A1 106 of FIG. 1 after process 500 is performed.

At 602, the control circuitry of a first network device (e.g., VTEP A1 106), receives a data packet addressed to a media access control (MAC) address (e.g., MAC-S1), wherein the first network device and a second network device are both connected to an ethernet segment (e.g., ES 104 of FIG. 1).

At 604, the control circuitry retrieves, from a forwarding table (e.g., table 300 of FIG. 3), an entry for the MAC address. The entry may include a local identifier of the ethernet segment (e.g., ES with global identifier ESI-10) marked as an active next hop identifier, and an identifier of the second network device (e.g., the name and MPLS label of VTEP A2 108) marked as a backup next hop identifier.

At 606, the control circuitry may extract, from the entry, the active next hop identifier. At 608, the control circuitry may check whether the connection to the ethernet segment was lost. If not, the control circuitry may, at 610, forward the data packet to the active next hop identifier (e.g., to ESI-10). If the connection to the ethernet segment was lost, the control circuitry may, at 612, forward the data packet to the second network device that was marked as backup.

In some embodiments, between steps 604 and 606, the control circuitry may delete the ESI-10 from the MAC table in response to determining that the connection to the ethernet segment was lost. In some embodiments, between steps 604 and 606, the control circuitry may mark the ESI-10 from the MAC table as a backup next hop and the identifier of the second network device as the "inactive" next hop in response to determining that the connection to the ethernet segment was lost. In such embodiments, at 606, the control circuitry will forward the packet to whichever next hop was marked active.

In some embodiments, step 608 may, instead, be performed proactively. That is whenever, the control circuitry detects a loss of connection between the first network device and the ethernet segment, it immediately updates the forwarding table (e.g., MAC table) to mark identifier of the second network device as an 'active' next hop, and to either delete or mark 'inactive' a next hop entry that lists the local identifier of the ethernet segment. In this case, after a data packet addressed to a media access control (MAC) address is received, the control circuitry may simply always route that data packet to whichever next hop is currently marked active.

Figure 7:
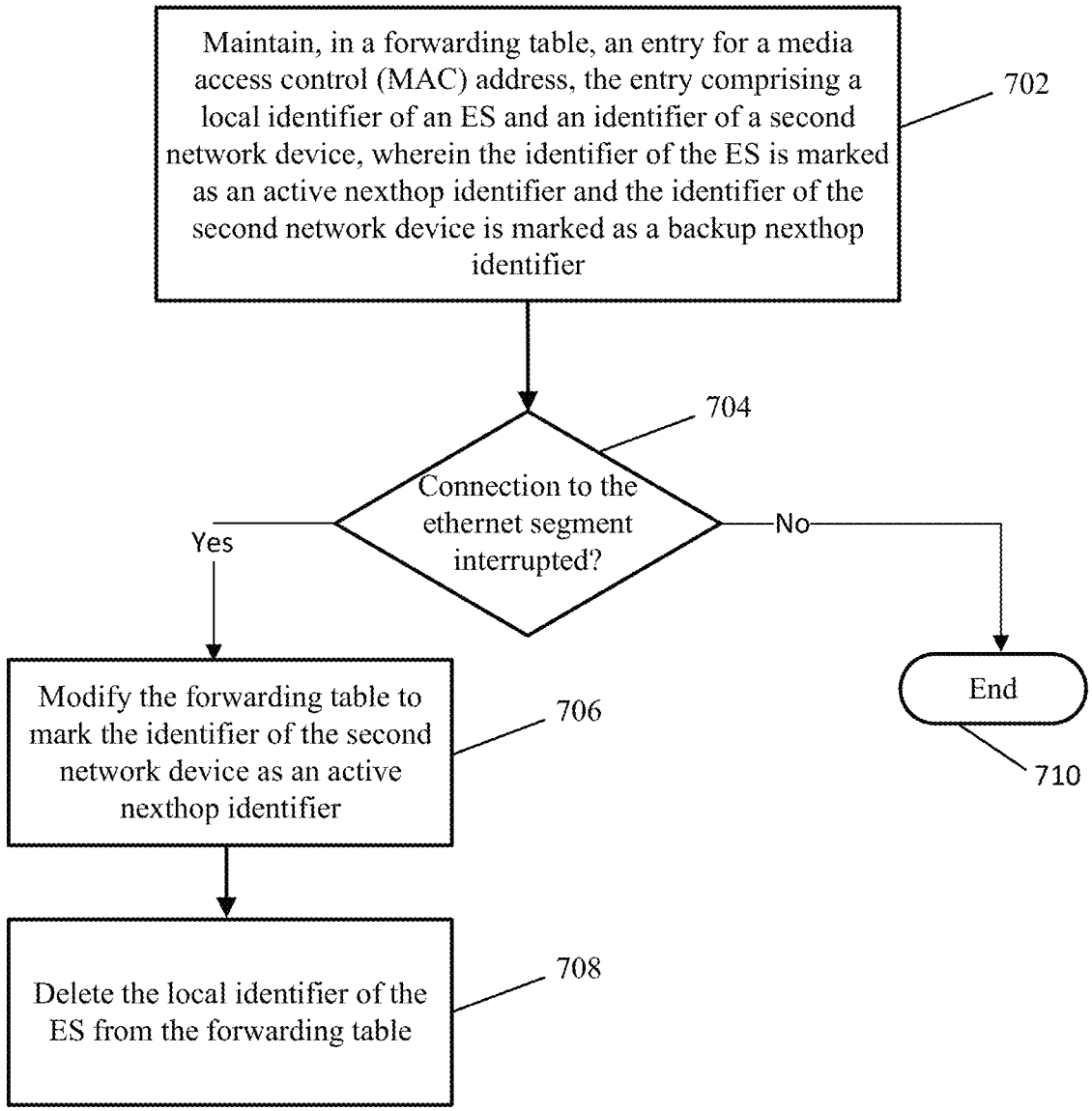
FIG. 7 is another flowchart of an illustrative process for optimizing routing, in accordance with some embodiments of the present disclosure.

FIG. 7 is a flowchart of a detailed illustrative process of modifying a forwarding table (e.g., a MAC table) and using that table for optimized routing, in accordance with some embodiments of the present disclosure. Process 700 may be performed by physical or virtual control circuitry, such as control circuitry 204 of device 200 (FIG. 2). In some embodiments, process 700 is performed by control circuitry of VTEP A1 106.

At 702, the control circuitry may maintain, in a forwarding table (e.g., in memory 208), an entry for a media access control (MAC) address. The entry may include a local identifier of an ES (e.g., ES 104) and an identifier of a second network device (e.g., of VTEP A2 108), wherein the identifier of the ES is marked as an active next hop identifier and the identifier of the second network device is marked as a backup next hop identifier.

At 704, the control circuitry may proactively check if the connection to the local ethernet segment (e.g., ES 104) is lost. If not, the process ends at 710, and normal operations of VTEP continue. If so, the process continues at 706.

At 706, the control circuitry may modify the forwarding table to mark the identifier of the second network device as an active next hop identifier. Additionally, at 708, the control circuitry may delete the local identifier of the ES from the forwarding table. Alternatively, the control circuitry may mark the local identifier of the ES from the forwarding table as 'inactive.' In this embodiment, whenever the control circuitry receives a packet destined for the MAC address, it routes to a next hop identifier marked 'active.'

Figure 8:
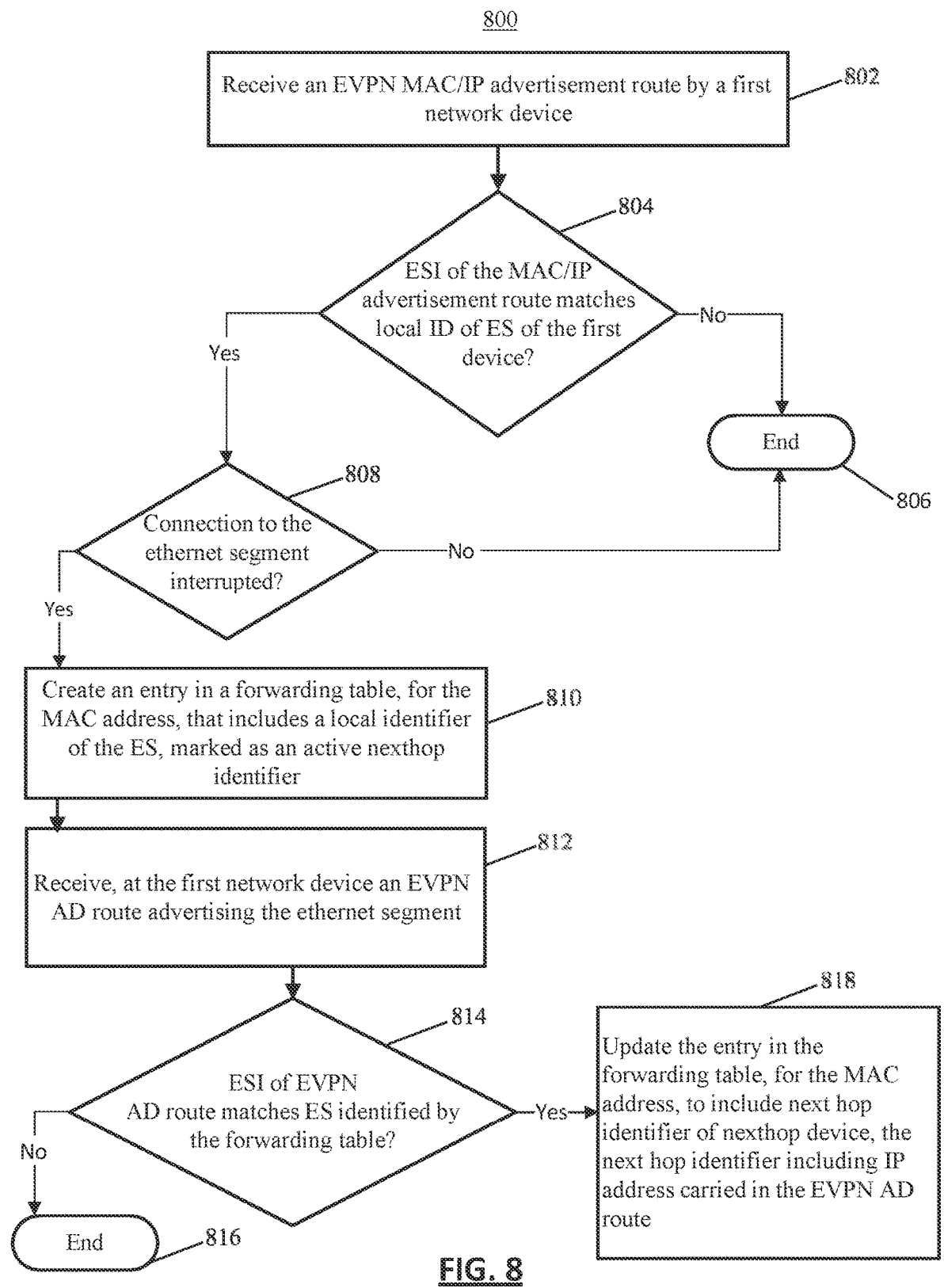
FIG. 8 is yet another flowchart of an illustrative process for optimizing routing, in accordance with some embodiments of the present disclosure.

FIG. 8 is a flowchart of a detailed illustrative process of optimized routing, in accordance with some embodiments of the present disclosure. Process 800 may be performed by physical or virtual control circuitry, such as control circuitry 204 of device 200 (FIG. 2). In some embodiments, process 800 is performed by control circuitry of VTEP A1 106.

At 802, the control circuitry may receive an EVPN MAC/IP advertisement route. In some embodiments, the route may be received from any device (e.g., from VTEP A2 108).

At 804, the control circuitry checks whether the ESI listed in the MAC/IP advertisement route (e.g., ESI-10) matches ES that is identified by local identification of an ES that is the local ES of the control circuitry (e.g., control circuitry of VTEP A1 106). The match is identified by first translating the ESI extracted from the route to a local identifier of the ES used by the local device, and then searching the forwarding table for the translated local identifier of the ES. If no match is found, the process ends at 806. Otherwise, the process continues at 808.

At 808, the control circuitry checks whether the connection to the local ethernet segment is active. If not, no further action is taken, and process 800 ends at 806. If the link to local ES is active, process 800 proceeds to step 810.

At 810, the control circuitry creates an entry in a local forwarding table (e.g., MAC table stored in memory 208), for that MAC address. The entry may include a local identifier of the ES, marked as an active next hop identifier. Such exemplary entry is shown, e.g., in FIG. 3. In some embodiments, the control circuitry may create a new entry for the MAC address when receiving an address resolution message including a new MAC address received by the control circuitry. In some embodiments, the control circuitry may create a new entry for the MAC after receiving an ethernet frame via the ethernet segment from a new MAC address. In other words, the control circuitry encountering any ethernet frame listing, as a source MAC, a new MAC that wasn't seen before will create a new forwarding table entry for that new MAC address.

After the new entry for the MAC address is established, the control circuitry may, at 812, receive any (e.g., previously received or newly received) EVPN auto discovery (AD) route messages advertising the local ethernet segment. At 814, the control circuitry checks whether such an EVPN AD route includes an ESI that matches ethernet segment now identified by the forwarding table. If not, process 800 ends at 816. If the match exists, the control circuitry, at 818, update the entry in the forwarding table, for the MAC address, to also include a next hop IP address carried in the EVPN AD route. In some embodiments, this next hop identifier may be marked as 'backup.'

While the processes 500, 600, 700, and 800 described above illustrate a single iteration of the operations of VTEP to update and use the MAC table, those skilled in the art will appreciate that these processes may be iteratively repeated to update and use the MAC table multiple times. The processes 500, 600, 700, and 800 described above are intended to be illustrative and not limiting. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

It will be apparent to those of ordinary skill in the art that systems and methods involved in the present disclosure may be embodied in a computer program product that includes a non-transitory computer-usable and/or -readable medium. For example, such a non-transitory computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

What is claimed is:

1. A method for forwarding network traffic when a network link is interrupted, the method comprising:
   receiving, at a first network device from a second network device, an ethernet virtual private network (EVPN) auto discovery (AD) route advertising an ethernet segment, wherein the first network device and the second network device are both connected to the ethernet segment;
   extracting, from the EVPN AD route, an ethernet segment identifier (ESI) and an identifier of the second network device;
   generating, for a forwarding table, an entry associated with a media access control (MAC) address, the entry comprising a local identifier of the ethernet segment and the identifier of the second network device, wherein the local identifier of the ethernet segment is marked as an active next hop, the identifier of the second network device is marked as a backup next hop, and data packets addressed to the MAC address are forwarded to the ethernet segment when the ethernet segment is marked as the active next hop and are not forwarded to the second network device when the second network device is marked as the backup next hop;
   determining whether a connection between the first network device and the ethernet segment has been interrupted; and
   in response to determining that the connection between the first network device and the ethernet segment has been interrupted, updating the entry associated with the MAC address by marking the identifier of the second network device as the active next hop, wherein the data packets addressed to the MAC address are forwarded to the second network device when the second network device is marked as the active next hop.

2. The method of claim 1, further comprising:
   receiving a first data packet addressed to the MAC address;
   retrieving, from the entry associated with the MAC address, the active next hop; and
   forwarding the first data packet to the second network device.

3. The method of claim 1, wherein the entry associated with the MAC address is a next hop group associated with a plurality of MAC addresses, the method further comprising:
   receiving a second data packet addressed to another MAC address of the plurality of MAC addresses;
   retrieving, from next hop group associated with a plurality of MAC addresses, the active next hop; and
   forwarding the second data packet to the second network device.

4. The method of claim 1 wherein the identifier of the second network device comprises: (a) IP address extracted from the EVPN AD route; and (b) label information received in the EVPN AD per EVPN instance route.

5. The method of claim 1, wherein the forwarding table was previously configured to include the local identifier of the ethernet segment in response to receiving an EVPN MAC/IP advertisement route that comprised the ethernet segment identifier.

6. The method of claim 1, wherein the entry associated with the MAC address was created based on the MAC address listed in the EVPN MAC/IP advertisement route.

7. The method of claim 1, wherein the first network device and the second network device provide multihoming to a device with MAC address via the ethernet segment.

8. The method of claim 1, wherein the identifier of the second network device is marked as a backup next hop identifier only when the first network device received for the ESI both an EVPN AD route per EVPN instance and an EVPN AD route per ESI.

9. The method of claim 1, further comprising:
   in response to determining that the connection between the first network device and the ethernet segment has been interrupted, updating the entry associated with the MAC address by deleting the local identifier of the ethernet segment.

10. A method for generating a forwarding table, the method comprising:
    receiving, at a first network device from a second network device, an ethernet virtual private network (EVPN) auto discovery (AD) route advertising an ethernet segment, wherein the first network device and the second network device are both connected to the ethernet segment;
    extracting, from the EVPN AD route, an ethernet segment identifier (ESI) and an identifier of the second network device; and
    generating, for a forwarding table, an entry associated with a media access control (MAC) address, the entry comprising the local identifier of the ethernet segment and the identifier of the second network device, wherein the local identifier of the ethernet segment is marked as an active next hop, the identifier of the second network device is marked as a backup next hop, and data packets addressed to the MAC address are forwarded to the ethernet segment when the ethernet segment is marked as the active next hop and are not forwarded to the second network device when the second network device is marked as the backup next hop.

11. The method of claim 10, wherein the first network device and the second network device provide multihoming to a device with MAC address via the ethernet segment.

12. The method of claim 10 wherein the identifier of the second network device is marked as a backup next hop only when the first network device received for the ESI both an EVPN AD route per EVPN instance and an EVPN AD route per ESI.

13. The method of claim 10, wherein the entry associated with the MAC address is a next hop group also associated with a plurality of MAC addresses of devices that are multihomed by the first network device and the second network device.

14. The method of claim 13, further comprising:
determining whether a connection between the first network device and the ethernet segment has been interrupted; and
in response to determining that the connection between the first network device and the ethernet segment has been interrupted, updating next hop group associated with a plurality of MAC addresses by marking the identifier of the second network device as the active next hop.

15. The method of claim 13, wherein updating the entry associated with the MAC address further comprises marking the local identifier of the ethernet segment as the backup next hop.

16. The method of claim 13, wherein updating the entry associated with the MAC address further comprises deleting the local identifier of the ethernet segment from the entry.

17. The method of claim 10, further comprising:
receiving an address resolution message including a new MAC address; and
generating, for the forwarding table, an entry associated with the new MAC, the entry comprising the local identifier of the ethernet segment and the identifier of the second network device, wherein the local identifier of the ethernet segment is marked as the active next hop and the identifier of the second network device is marked as the backup next hop.

18. The method of claim 10, further comprising:
receiving an ethernet frame via the ethernet segment from a new MAC address; and
generating, for the forwarding table, an entry for the new MAC, the entry comprising the local identifier of the ethernet segment and the identifier of the second network device, wherein the local identifier of the ethernet segment is marked as the active next hop and the identifier of the second network device is marked as the backup next hop.

19. The method of claim 10, further comprising:
receiving a route advertisement advertising a path to a new MAC address; and
generating, for the forwarding table, an entry for the new MAC, the entry comprising the local identifier of the ethernet segment and the identifier of the second network device, wherein the local identifier of the ethernet segment is marked as the active next hop and the identifier of the second network device is marked as the backup next hop.

20. A method for forwarding network traffic when a network link is interrupted, the method comprising:
receiving, at a first network device, a data packet of data packets addressed to a media access control (MAC) address, wherein the first network device and a second network device are both connected to an ethernet segment;
retrieving, from a forwarding table, an entry associated with the MAC address, wherein the entry includes a local identifier of the ethernet segment marked as an active next hop, an identifier of the second network device marked as a backup next hop, and data packets addressed to the MAC address are forwarded to the ethernet segment when the ethernet segment is marked as the active next hop and are not forwarded to the second network device when the second network device is marked as the backup next hop;
extracting, from the entry, the active next hop;
determining whether a connection between the first network device and the ethernet segment has been interrupted; and
in response to determining that the connection between the first network device and the ethernet segment has been interrupted, forwarding the data packet to the second network device.

21. The method of claim 20, wherein the first network device and the second network device provide multihoming to a device with MAC address via the ethernet segment.

22. The method of claim 20, wherein the entry associated with the MAC address is also associated with a plurality of MAC addresses of devices that are multihomed by the first network device and the second network device.

23. The method of claim 20 wherein the identifier of the second network device is marked as a backup next hop only when the first network device received both an EVPN AD route per EVPN instance and an EVPN AD route per ESI.

24. The method of claim 20, further comprising updating the entry associated with the MAC address by marking the identifier of the second network device as the active next hop.

25. A first network device, the first network device comprising:
a memory configured to store a forwarding table;
a communication circuitry configured to receive from a second network device, an ethernet virtual private network (EVPN) auto discovery (AD) route advertising an ethernet segment, wherein the first network device and the second network device are both connected to the ethernet segment; and
a control circuitry configured to:
extract, from the EVPN AD route, an ethernet segment identifier (ESI) and an identifier of the second network device;
generate, for the forwarding table, an entry associated with a media access control (MAC) address, the entry comprising a local identifier of the ethernet segment and the identifier of the second network device, wherein the local identifier of the ethernet segment is marked as an active next hop, the identifier of the second network device is marked as a backup next hop, and data packets addressed to the MAC address are forwarded to the ethernet segment when the ethernet segment is marked as the active next hop and are not forwarded to the second network device when the second network device is marked as the backup next hop;
determine whether a connection between the first network device and the ethernet segment has been interrupted; and
in response to determining that the connection between the first network device and the ethernet segment has been interrupted, update the entry associated with the MAC address by marking the identifier of the second network device as the active next hop.

26. The first network device of claim 25, wherein the control circuitry is further configured to:

receive a data packet addressed to the MAC address;
retrieve, from the entry associated with the MAC address, the active next hop; and
forward the data packet to the second network device.

27. The first network device of claim 25, wherein the entry associated with the MAC address is a next hop group also associated with a plurality of MAC addresses, wherein the control circuitry is further configured to:
receive another data packet addressed to another MAC address of the plurality of MAC addresses;
retrieve, from the next hop group associated with a plurality of MAC addresses, the active next hop; and
forward the another data packet to the second network device.

28. The first network device of claim 25, wherein the first network device and the second network device provide multihoming to a device with MAC address via the ethernet segment.

29. The first network device of claim 25, wherein the identifier of the second network device is marked as a backup next hop identifier only when the first network device received for a given ESI both an EVPN AD route per EVPN instance and an EVPN AD route per ESI.

30. The first network device of claim 25, wherein the control circuitry is further configured to:
in response to determining that the connection between the first network device and the ethernet segment has been interrupted, update the entry for the MAC address by deleting the local identifier of the ethernet segment.

* * * * *